United States Patent
Brown, Jr. et al.

[19]

[11] Patent Number: 5,958,804
[45] Date of Patent: Sep. 28, 1999

[54] FABRICS HAVING IMPROVED BALLISTIC PERFORMANCE AND PROCESSES FOR MAKING THE SAME

[75] Inventors: Gordon L. Brown, Jr., Anderson, S.C.; Dieter R. Wachter, Darien, Conn.; Mark A. Anderson, Anderson, S.C.

[73] Assignee: Hexcel CS Corporation, Stamford, Conn.

[21] Appl. No.: 08/863,973

[22] Filed: May 27, 1997

Related U.S. Application Data

[62] Division of application No. 08/616,690, Mar. 15, 1996, Pat. No. 5,788,907.

[51] Int. Cl.⁶ .............................. D03D 15/00; F41H 1/02
[52] U.S. Cl. .............................. 442/192; 2/2.5; 139/99; 139/426 R; 442/195; 428/902; 428/911
[58] Field of Search .................... 428/911, 902; 2/2.5; 442/189, 192, 195; 139/426 R, 99; 261/175

[56] References Cited

U.S. PATENT DOCUMENTS

| | | |
|---|---|---|
| 4,403,012 | 9/1983 | Harpell et al. . |
| 4,457,985 | 7/1984 | Harpell et al. . |
| 4,501,856 | 2/1985 | Harpell et al. . |
| 4,543,286 | 9/1985 | Harpell et al. . |
| 4,563,392 | 1/1986 | Harpell et al. . |
| 4,584,347 | 4/1986 | Harpell et al. . |
| 4,613,535 | 9/1986 | Harpell et al. . |
| 4,623,574 | 11/1986 | Harpell et al. . |
| 4,650,710 | 3/1987 | Harpell et al. . |
| 4,681,792 | 7/1987 | Harpell et al. . |
| 4,737,401 | 4/1988 | Harpell et al. . |
| 4,737,402 | 4/1988 | Harpell et al. . |
| 4,748,064 | 5/1988 | Harpell et al. . |
| 4,819,458 | 4/1989 | Kavesh et al. . |
| 4,820,568 | 4/1989 | Harpell et al. . |
| 4,876,774 | 10/1989 | Kavesh et al. . |
| 4,883,700 | 11/1989 | Harpell et al. . |
| 4,897,902 | 2/1990 | Kavesh et al. . |
| 4,916,000 | 4/1990 | Li et al. . |
| 5,006,390 | 4/1991 | Kavesh et al. . |
| 5,061,545 | 10/1991 | Li et al. . |
| 5,093,158 | 3/1992 | Li et al. . |
| 5,124,195 | 6/1992 | Harpell et al. . |
| 5,135,804 | 8/1992 | Harpell et al. . |
| 5,160,776 | 11/1992 | Li et al. . |
| 5,175,040 | 12/1992 | Harpell et al. . |
| 5,330,820 | 7/1994 | Li et al. . |
| 5,343,796 | 9/1994 | Cordova et al. . |
| 5,354,605 | 10/1994 | Lin et al. . |
| 5,376,426 | 12/1994 | Harpell et al. . |
| 5,395,683 | 3/1995 | Bledsoe et al. . |
| 5,397,627 | 3/1995 | Dunbar et al. . |
| 5,421,377 | 6/1995 | Bonigk ................................. 139/426 R |
| 5,536,553 | 7/1996 | Coppage, Jr. et al. ................. 428/102 |
| 5,788,907 | 8/1998 | Brown, Jr. et al. ..................... 264/280 |

*Primary Examiner*—Blaine Copenheaver
*Attorney, Agent, or Firm*—Alston & Bird LLP

[57] ABSTRACT

The invention provides fabrics having improved ballistic performance and processes for making the same. The fabrics include a network of consolidated multifilament yarns formed of high strength filaments. At least a portion of the high strength filaments of the yarns, are temporarily locked together to provide a substantially stable, flattened cross-sectional configuration to the yarns. The resultant fabrics are capable of absorbing an impact from a projectile, i.e., a bullet or shrapnel, directed toward the fabric and substantially decreasing its velocity. The fabric can also provide slippage or movement of the yarns relative to one another to dissipate the energy of impact of a projectile across a greater surface area of the fabric.

16 Claims, 1 Drawing Sheet

FABRICS HAVING IMPROVED BALLISTIC PERFORMANCE AND PROCESSES FOR MAKING THE SAME

This application is a divisional of application Ser. No. 08/616,690, filed Mar. 15, 1996 now U.S. Pat. No. 5,788,907.

FIELD OF THE INVENTION

This invention relates generally to fabrics including high strength filaments, and more particularly to fabrics including high strength filaments which are useful for ballistic applications, and to processes of making the same.

BACKGROUND OF THE INVENTION

High strength fibers and filaments are widely used in ballistic resistant articles, such as bullet proof vests, curtains, mats, raincoats and umbrellas. Exemplary high strength fibers include aramid fibers, high molecular weight polyethylene fibers, nylon fibers, glass fibers, and the like. Various ballistic resistant articles which include high strength fibers made from materials such as high molecular weight polyethylene are described, for example, in U.S. Pat. Nos. 4,820,568; 4,748,064; 4,737,402; 4,737,401; 4,681,792; 4,650,710; 4,623,574; 4,613,535; 4,584,347; 4,563,392; 4,543,286; 4,501,856; 4,457,985; and 4,403,012.

For many ballistic resistant articles, such as vests, linings, and the like, flexibility is a desired characteristic for comfort and mobility of the wearer. In these and other applications, typically the ballistic resistant article includes a plurality of woven or knit fabrics formed of high strength fibers and/or filaments. For example, U.S. Pat. No. 4,737,401 describes various woven fabrics made from high molecular weight extended chain polyethylene and polypropylene yarns, extended chain polyvinyl alcohol yarns, and extended chain polyacrylonitrile yarns. U.S. Pat. No. 4,681,792 describes articles which include first and second portions, the first portion comprising a plurality of layers of a first woven fabric and the second portion comprising a plurality of layers of a second woven fabric. The fabrics of each of the first and second portions are selected to provide differing resistances to displacement of the fibers therein.

U.S. Pat. No. 5,135,804 describes the application of heat and pressure to a network of high strength polyethylene fibers, including woven high strength polyethylene fabrics, to provide an article having consolidation among the fibers to one of four levels. The fiber network is treated at temperatures ranging from 100° C. to 160° C. (212° F. to 320° F.) and pressures ranging from 0.5 to 1 MPa (in an autoclave) up to 1 to 200 MPa (in a molding press). The patent indicates that temperatures and pressures at the high end of these ranges, which deform the fibers and form film-like structures, are required to achieve ballistic-resistant articles.

These and other structures of high strength fibers can provide good ballistic performance when incorporated into a ballistic resistant article, such as a vest. However, to provide the desired degree of resistance to displacement of the fibers or filaments upon impact of a projectile, i.e., a bullet or shrapnel, typically multiple layers of such fabrics must be used to construct the ballistic resistant article. Such articles can be heavy as a result. The use of multiple layers of fabric can also compromise the flexibility of the resultant article. These factors can in turn reduce wearer comfort and mobility. Further, the use of a large number of fabric layers can increase the cost of such articles.

SUMMARY OF THE INVENTION

The present invention provides fabrics made from high strength filaments which can provide improved or enhanced ballistic protection as compared to conventional fabrics of high strength filaments. For example, the fabrics of the invention can be used to construct ballistic resistant articles which are substantially thinner, i.e., have fewer layers, than conventional articles but which also exhibit comparable, and in some cases superior, ballistic protection. The fabrics of the invention can also be used to construct ballistic resistant articles which have improved ballistic performance as compared to articles of substantially equal weights and construction formed of conventional fabrics. Further benefits can include reduced trauma to the victim by reduced "backfaced signature" i.e., the deformation of the fabric into the victim.

The fabrics of the present invention are formed of a network, preferably woven, of consolidated multifilament yarns comprising high strength filaments. Within the yarns of the fabrics, at least a portion of the high strength filaments are temporarily locked together to provide a substantially stable, flattened cross-sectional configuration to the yarns. As used herein, the term "substantially stable" indicates that the yarns can maintain their flattened configuration outside of the fabric network, believed due at least in part to some degree of filament-to-filament bonding within the yarns. However, although filaments within the yarns can be locked together at least temporarily, the yarns maintain a substantially fibrous configuration, i.e., the yarns retain their individual identity and are not substantially deformed or film-like in appearance.

This fabric construction is advantageous in many regards. The consolidated, flattened multifilament yarns are believed to contribute to the impact resistance of the fabrics and resistance to displacement of filaments therein. The fabrics can be capable of receiving the impact of a projectile directed toward the fabric and of engaging the projectile upon impact with the fabric to substantially decrease the velocity thereof. However, the multifilament yarns are also capable of slipping or moving relative to one another upon impact of a projectile. This is believed to be advantageous in distributing or dissipating the energy of impact across a higher surface area of the fabric.

The fabrics preferably include high strength filaments having a tenacity of at least 7 grams/denier, a tensile modulus of at least about 150 grams/denier and an energy-to-break of at least about 8 Joules/gram. Exemplary high strength filaments include extended chain polyolefin filaments, aramid filaments, polyvinyl alcohol filaments, polyacrylonitrile filaments, liquid crystalline polymer filaments, S-2 glass filaments, carbon filaments, high tenacity polyamide filaments, high tenacity polyester filaments, polybenzoxazole filaments, and mixtures thereof. Preferred filaments are extended chain polyethylene filaments.

The present invention also provides processes for making the fabrics of the invention having enhanced ballistic performance. In this embodiment of the invention, a fibrous network of multifilament yarns including high strength filaments is provided. Preferably the fibrous network is a woven fabric of such filaments. The yarns can be any of the conventional high strength yarns known in the art, and typically have a substantially circular cross-sectional configuration.

In the processes of the invention, a precursor fibrous network of multifilament yarns including high strength filaments having a first cross-sectional configuration is treated under conditions sufficient to change or alter the cross-sectional configuration of the multifilament yarns, i.e., to flatten the yarns. The flattened yarns can become more uniformly aligned and/or spread out during such treatment so that the resultant fabric can have a substantially flat, smooth appearance.

Further, during such treatment, the yarns of the fabric can be consolidated, i.e., at least a portion of the filaments therein are temporarily locked together. This can impart substantial stability to the flattened cross-section profile of the yarns, i.e., the yarns can maintain their flattened profile when gently manipulated and removed from the fabric network. The conditions are also selected, however, to substantially preserve the fibrous nature of the yarns in the fabric, i.e., to retain their individual identity and to prevent substantial degradation or melting of the yarns. Preferably, for woven fabrics of high strength polyethylene filaments, the fabric is subjected to pressure and heat conditions of about 300 Newtons and about 122° F., for example, by calendering the fabric at a speed of about 27 meters per minute.

Compared to conventional ballistic resistant fabric, the fabrics of the present invention can advantageously provide a selected level of ballistic protection while employing a reduced weight of protective material. Alternatively, the fabrics of the invention can provide increased ballistic protection when the article has a weight substantially equal to the weight of a conventionally constructed piece of flexible fabric type soft armor. Thus, such articles can be manufactured with reduced weight, at reduced costs, and can maintain a high degree of flexibility. These factors can in turn can increase wearer comfort and mobility. Further, the fabrics are also useful in the construction of ballistic resistant articles which include ballistic resistant composite materials, such as composites formed of high strength fibers imbedded in a polymeric matrix.

BRIEF DESCRIPTION OF THE DRAWINGS

In the drawings which form a portion of the original disclosure of the invention.

DETAILED DESCRIPTION OF THE PREFERRED EMBODIMENTS

In the following detailed description of the invention, specific preferred embodiments of the invention are described to enable a full and complete understanding of the invention. It will be recognized that it is not intended to limit the invention to the particular preferred embodiments described, and although specific terms are employed in describing the invention, such terms are used in the descriptive sense for the purpose of illustration and not for the purpose of limitation. It will be apparent that the invention is susceptible to variations and changes as will be apparent from a consideration of the foregoing discussion and the following detailed description.

Figure 1:
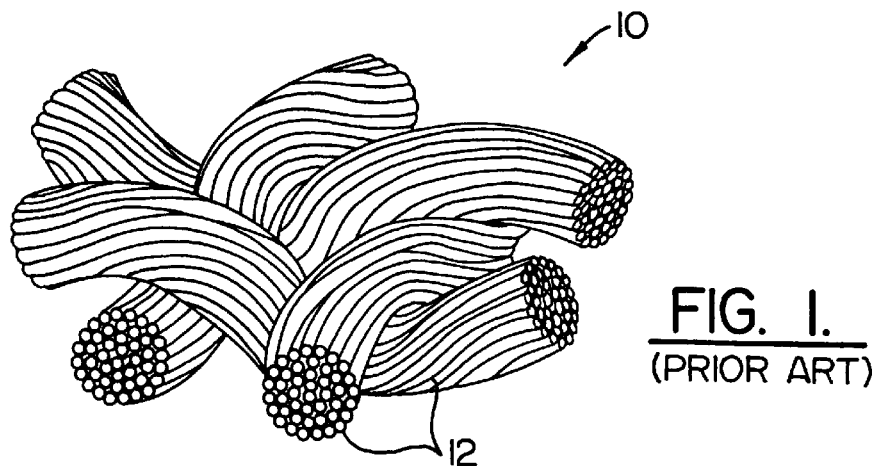
FIG. 1 is a perspective view of a conventional fabric including a network of high strength yarns.
Figure 2:
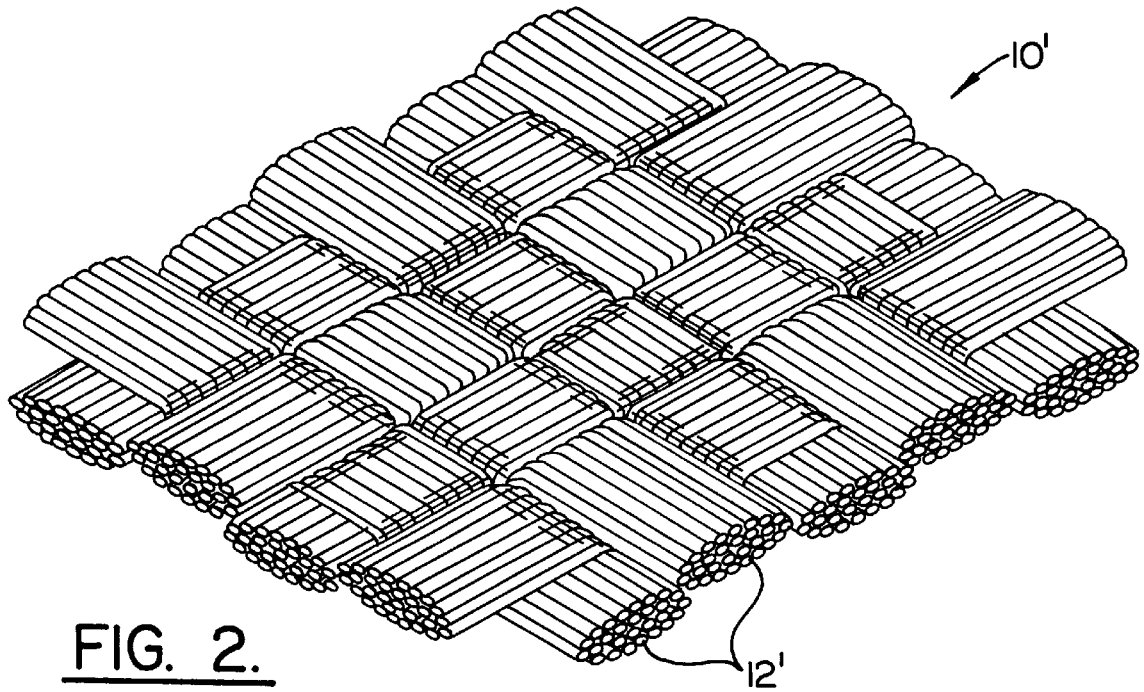
FIG. 2 is a perspective view of a fabric according to the invention.

FIGS. 1 and 2 are perspective views of a conventional fabric 10 and of a fabric 10' according to the invention, respectively. The fabrics 10 and 10' comprise a network of high strength fibers or filaments as known in the art and can be manufactured using any of the techniques known in the art for forming a fibrous coherent web of high strength fibers or filaments, for example, by weaving, knitting, carding or other nonwoven fabric manufacturing techniques, and the like. The fabrics of the invention are manufactured so as to as provide a high strength fabric suitable for ballistic applications, and preferably are woven fabrics.

Fabrics 10' of the invention are useful in various ballistic applications, i.e., as a component in any of the types of composite products useful for ballistic protection. For example, the fabrics of the invention are useful as a layer in a multilayer article, including but not limited to, body armor, vests, linings, and the like.

As illustrated in FIGS. 1 and 2, fabrics 10 and 10' are woven fabrics formed from a plurality of multifilament yarns 12 and 12', respectively. As used herein, "filament" and "fiber" denotes a polymer which has been formed into an elongate body, the length dimension of which is much greater than the transverse dimensions of width and thickness. "Multifilament yarn" (also referred to herein as "yarn bundle") denotes an elongated profile which has a longitudinal length which is much greater than its cross-section and is comprised of a plurality or bundle of individual filaments or filament strands.

As illustrated in FIG. 2, the multifilament yarns or fiber bundles 12' of fabric 10' of the invention are flattened, for example, to a substantially oval or oblong shape, as compared to the configuration of the multifilament yarns 12 of a conventional fabric 10. That is, the yarns tend to assume a less round or more flat profile as depicted in FIG. 2, in contrast to a substantially round or circular profile, illustrated in FIG. 1. Further, the flattened yarns can be more uniformly aligned and/or spread out so that the resultant fabric can have a substantially flat, smooth appearance and feel.

The yarns 12' of fabric 10' of the invention are also consolidated, i.e., at least a portion of the high strength filaments are temporarily locked together within the yarns to substantially stabilize the flattened cross-sectional profile of the yarns. As used herein, the terms "substantially stable" or "substantially stabilized" indicate that the yarns can maintain their flattened configuration outside of the fabric network, for example, if the fabric is gently manipulated to remove yarns therefrom. Although not wishing to be bound by any theory of the invention, it is believed that there is some degree of filament-to-filament thermal bonding within the yarns. Such bonding can be temporary in the sense that discrete filaments within the yarns can be removed one from another when a yarn is manipulated outside of the fabric network structure.

Fabrics formed of consolidated multifilament yarns having a substantially flattened profile can provide several advantages in the ballistic performance of the fabrics. Although not wishing to be bound by any explanation or theory of the invention, it is believed that the modified flattened profile of the yarns provides increased surface area contact between individual yarns, as compared to conventional substantially circular yarns. This in turn can provide resistance to displacement of filaments and/or fibers in the yarns upon impact by a projectile, i.e., a bullet or shrapnel. The term "resistance to displacement" refers to the force required to displace a fiber or filament in a given direction in the plane defined by the major face of the layer relative to an adjacent fiber or filament in the same layer. In preferred uses of the fabrics, the fabrics are incorporated in an article and the force which may displace the fiber or filament of a given layer would be generated by a projectile, e.g., a bullet or shrapnel, impacting the fibrous layer. The ballistic performance of the fabrics is further enhanced by the consolidation of the yarns, and the temporary locked structure of filaments within the yarns.

However, although a flattened yarn profile and consolidation between filaments within the yarns are provided to impart increased resistance to filament displacement, the fabrics of the invention also provide at least some degree of slippage or movement of the yarns relative to one another. Thus, upon impact of a projectile on the fabric, the yarns can move or slip relative to one another, thereby acting to absorb the force of projectile impact and/or spread or dissipate the force of impact across a higher surface area of the fabric.

High strength filaments which are useful in the fabrics of this invention include those formed of any of the high strength polymers as known in the art. Exemplary high strength filaments include those having a tenacity equal to or greater than about 7 grams per denier (g/d), a tensile modulus equal to or greater than about 150 g/d and an energy-to-break equal to or greater than about 8 Joules/gram (J/g). Tensile properties can be evaluated as known in the art, for example, by pulling a 10 inch (25.4 cm) fiber length clamped in barrel clamps at a rate of 10 inches/minute (25.4 cm/min) on an Instron Tensile Tester. Preferred filaments are those having a tenacity at least about 10 g/d, more preferably at least about 15 g/d, and most preferably at least about 25 g/d; a tensile modulus at least about 200 g/d, more preferably at least about 300 g/d, and most preferably at least about 400 g/d; and an energy-to-break at least about 20 J/g, more preferably at least about 30 J/g, and most preferably at least about 35 J/g.

Types of filaments that meet the strength requirements include extended chain polyolefin filaments, aramid filaments, polyvinyl alcohol filaments, polyacrylonitrile filaments, liquid crystalline polymer filaments, S-2 glass filaments, carbon filaments, boron filaments, high tenacity polyamide filaments, high tenacity polyester filaments, polybenzoxazole filaments, and mixtures thereof. Extended chain polyethylene and extended chain polypropylene are the preferred extended chain polyolefin filaments.

The extended chain polyolefins can be formed by polymerization of $\alpha,\beta$-unsaturated monomers of the formula $R_1R_2C=CH_2$, wherein $R_1$ and $R_2$ are the same or different and are hydrogen, hydroxy, halogen, alkylcarbonyl, carboxy, alkoxycarbonyl, heterocycle or alkyl or aryl either unsubstituted or substituted with one or more substituents selected from the group consisting of alkoxy, cyano, hydroxy, alkyl and aryl. For greater detail of such polymers of $\alpha,\beta$-unsaturated monomers, see U.S. Pat. No. 4,916,000, hereby incorporated by reference.

U.S. Pat. No. 4,457,985, hereby incorporated by reference, generally discusses such high molecular weight extended chain polyethylene and polypropylene filaments. In the case of polyethylene, suitable filaments are those of molecular weight of at least 150,000, preferably at least 300,000 more preferably at least one million and most preferably between two million and five million. Such extended chain polyethylene (ECPE) filaments are known and may be grown in solution as described in U.S. Pat. No. 4,137,394 or U.S. Pat. No. 4,356,138, or may be a filament spun from a solution to form a gel structure, as described in German Off. 3 004 699 and GB 20512667 and 2042414, and especially described in U.S. Pat. Nos. 4,413,110 and 4,551,296, also hereby incorporated by reference. Other high strength polyethylene filaments and techniques known for forming such filaments, including variations of the above techniques, can also be used in accordance with the present invention. Depending upon the formation technique, the draw ratio and temperatures, and other conditions, a variety of properties can be imparted to these fibers.

The previously described highest values for tenacity, modulus and energy-to-break are generally obtainable by employing these solution grown or gel filament processes. A particularly preferred high strength filament is extended chain polyethylene filament known as Spectra®, which is commercially available from Allied-Signal, Inc. As used herein, the term polyethylene refers to predominantly linear polyethylene materials that may contain minor amounts of chain branching or comonomers not exceeding 5 modifying units per 100 main chain carbon atoms, and that may also contain admixed therewith not more than about 50 weight percent of one or more polymeric additives such as alkene-1-polymers, in particular, low density polyethylene, polypropylene or polybutylene, copolymers containing mono-olefins as primary monomers, oxidized polyolefins, graft polyolefin copolymers and polyoxymethylenes, or low molecular weight additives such as antioxidants, lubricants, ultraviolet screening agents, colorants and the like, which are commonly incorporated by reference.

Similarly, highly oriented polypropylene of molecular weight at least 200,000, preferably at least one million and more preferably at least two million, may be used. Such high molecular weight polypropylene may be formed into reasonably well-oriented filaments by techniques described in the various references referred to above, and especially by the technique of U.S. Pat. Nos. 4,663,101 and 4,784,820, and published application WO 89 00213. Since polypropylene is a much less crystalline material than polyethylene and contains pendant methyl groups, tenacity values achievable with polypropylene are generally substantially lower than the corresponding values for polyethylene. Accordingly, a suitable tenacity is at least about 8 g/d, preferably at least about 11 g/d, and more preferably at least about 15 g/d. The tensile modulus for polypropylene is at least about 150 g/d, preferably at least about 200 g/d, more preferably at least about 250 g/d, and most preferably at least about 300 g/d. The energy-to-break of the polypropylene is at least about 8 J/g, preferably at least about 40 J/g, and most preferably at least about 60 J/g.

Useful aramid fibers include poly (para-amide) fibers having a modulus of at least about 400 grams/denier and tenacity of at least about 18 grams/denier are useful in the fabrics of the invention, for example, poly (phenylenediamine terephthalamide) fibers produced commercially by DuPont Corporation under the trade name Kevlar® and having moderately high moduli and tenacity values.

High molecular weight polyvinyl alcohol filaments having high tensile modulus are described in U.S. Pat. No. 4,440,711, hereby incorporated by reference. Preferred polyvinyl alcohol filaments will have a tenacity of at least about 10 g/d, a modulus of at least about 200 g/d and an energy-to-break of at least about 8 J/g, and particularly preferred polyvinyl alcohol filaments will have a tenacity of at least about 15 g/d, a modulus of at least about 300 g/d and an energy-to-break of at least about 25 J/g. Most preferred polyvinyl alcohol filaments will have a tenacity of at least about 20 g/d, a modulus of at least about 500 g/d and an energy-to-break of at least about 30 J/g. Suitable polyvinyl alcohol filament having a weight average molecular weight of at least about 200,000 can be produced, for example, by the process disclosed in U.S. Pat. No. 4,599,267.

In the case of polyacrylonitrile (PAN), PAN filament for use in the present invention are of molecular weight of at least about 400,000. Particularly useful PAN filament should have a tenacity of at least about 10 g/d and an energy-to-break of at least about 8 J/g. PAN filament having a molecular weight of at least about 400,000, a tenacity of at least about 15 to about 20 g/d and an energy-to-break of at least about 25 to about 30 J/g is most useful in producing ballistic resistant articles. Such filaments are disclosed, for example, in U.S. Pat. No. 4,535,027.

In the case of liquid crystal copolyesters, suitable filaments are disclosed, for example, in U.S. Pat. Nos. 3,975,487; 4,118,372;and 4,161,470, hereby incorporated by reference. Tenacities of about 15 to 30 g/d, more preferably about 20 to 25 g/d, modulus of about 500 to 1500 g/d, preferably about 1000 to 1200 g/d, and an energy-to-break of at least about 10 J/g are particularly desirable.

The yarn can include filaments of more than one type of high strength filament. Preferably, however, the yarn is formed from filaments of only one type of high strength filament. The dpf of the yarn should be at least 1.75, preferably at least 2.5, and most preferably 3.0.

If high molecular weight extended chain polyethylene filament is used to form the yarn, the denier of the resulting yarn should range from about 100 to about 4800, preferably from about 200 to about 650. Especially preferred are 215, 375, 430 and 650 denier multifilament yarns. The number of extended chain polyethylene filaments in a single yarn can range from about 30 to 480, with about 60 to 120 filaments being especially preferred.

As noted above, preferably the fabrics of the invention are formed by forming a network of high performance fibers or filaments using conventional techniques such as weaving, knitting, and the like, and preferably by weaving. For woven fabrics, the weave pattern can be any conventional pattern such as plain, basket, satin, crow feet, rib and twill, and preferably is a plain weave pattern. It is to be noted that if the network comprises yarns arranged in an overlapping arrangement (such as a plain or basket weave), the surface area of contact between adjacent yarns will increase, thus increasing the resistance of displacement of filaments due in part to the increased frictional forces created by the increased contact surface area.

The fibers or filaments may be precoated with a polymeric material, preferably an elastomer based material, prior to being arranged in a network. A wide variety of suitable coating materials and techniques for coating filaments using the same are well known in the art, for example, as described in U.S. Pat. Nos. 4,650,710, 4,737,401, and 5,124,195.

Any of the known matrix materials can also be used in manufacturing the fabrics of the invention, for example by coating the fabrics of the invention with a matrix material. The use of fibrous networks without additional matrix materials, however, can be advantageous, minimizing or eliminating the need for manipulating a separate matrix material.

When the fabrics of the invention are woven fabrics, the weave construction used for the woven fabrics can be any conventional pattern, including 45×45, 34×34, and 56×56 plain weave pattern, with a 45×45 plain weave pattern (45 yarn ends/inch in the warp direction; 45 yarn ends/inch in the fill direction) being preferred.

Fabrics of the present invention that can be formed from the yarn may include only one type of high strength filament, preferably high molecular weight extended chain polyethylene. It is also contemplated that a fabric could include a second type of filament such as another high strength filament, or a filament that improves the feel or stretchability of the fabric such as nylon, polyester, spandex, polypropylene, cotton, silk, etc. For example, extended chain polyethylene filaments can be used for the warp yarn and the second filament could be used for the fill yarn, or vice versa. Regardless of what type of filament is used for the second filament, what is important to the strength of the fabric is that it includes yarn of high strength filaments in either the warp or fill direction. If the fabric is formed from extended chain polyethylene exclusively, the filament used in one direction (e.g., the warp) may be of a different tenacity, modulus, filament number, filament or total denier, twist than the filament used in the other direction (e.g., the fill).

To make the fabrics of the invention, a network of multifilament yarns including high strength filaments is provided. The filaments can be formed of any of the high strength polymers known in the art, such as those described above. The cross-section of the fibers or filaments of precursor fabrics can vary widely. Typically such fibers or filaments have a circular or substantially circular cross-section. Filaments having other cross-sections, for example, oblong, irregular or regular multi-lobed, and the like, can also be used so long as the fibers or filaments are capable of being flattened as described below.

The precursor fabric is subjected to conditions of pressure and temperature sufficient to provide the enhanced or improved ballistic resistant fabrics of the invention. In this regard, sufficient pressure and temperature are applied to the precursor fabric to alter or change the profile of the yarns therein from a first cross-section, typically substantially circular shape as illustrated in FIG. 1, to a more flat shape as illustrated in FIG. 2. This, in turn, increases the surface area contact of the yarns, as described above, and can provide improved projectile penetration resistance. It is also to be noted that the cross-sectional configuration of discrete filaments of the multifilament yarns can also change, for example, to provide yarns having a plurality of flattened filaments about the periphery of the yarn. The pressure and temperature applied to the fabric should not be so great, however, so as to substantially modify or destroy the fibrous nature of the yarns.

Sufficient pressure and temperature are also applied to the fabric to consolidate the yarns and temporarily lock together at least a portion of the filaments therein to substantially stabilize the flattened profile of the yarns. It is believed that appropriate pressure and temperature conditions can soften the polymer of the filaments and induce some degree of filament-to-filament adhesion or bonding within the fiber bundles. However, fabric treatment conditions, i.e., pressure and/or temperature, should not be such that the polymer substantially softens or melts, thus compromising the discrete individual identity and fibrous nature of the yarns. It is also to be noted that as illustrated in FIG. 2, pressure and temperature conditions can also be selected to impart a substantially stable, crimped structure to the yarns of the fabrics at their cross-over or contact points, which can be retained by the yarns outside of the fabric network.

Thus, pressure and temperature conditions are selected to alter, i.e., flatten, yarn profile and to provide some degree of yarn consolidation, without substantially compromising or impairing the individual identity of the yarns or the ability of the yarns to slip upon impact by a projectile.

To provide a consolidated, flattened yarn profile, yet also maintain slippage of the discrete yarns, the inventors have found that precursor fabrics can be calendered by directing the fabric between the nip formed by cooperating calender rolls, preferably a pair of smooth calender rolls. The operating pressure and temperature of the calender rolls should be adjusted to a pressure and surface temperature such that the yarn profiles are altered, i.e., flattened, and that the filaments of the yarns are thermally activated to temporarily lock the filaments together, thereby substantially stabilizing the flattened profile of the yarns. On the other hand, the pressure and heat transfer conditions are advantageously maintained to avoid substantial thermal degradation or melting of the yarns which are present within the fabric, and to avoid film formation.

As the skilled artisan will appreciate, calendering conditions including pressure and temperature of the rolls can vary according to the particular polymer composition of the filaments used and can be determined based upon the knowledge of the skilled artisan. Advantageously, for fabrics manufactured using high density polyethylene as described above, the calender rolls are set to apply a pressure from about 290 to about 310, preferably about 300, Newtons, and a temperature from about 113° F. to about 131° F. (about 45° C. to about 55° C.), preferably about 122° F. (50° C.) to the fabric. The fabric can be fed through the rolls at a speed of about 22 to 30 meters per minute, preferably about 27 meters per minute.

As will be appreciated by the skilled artisan, the use of heated pressure rolls may result in some minor degree of yarn deformation and loss of individual fibrous identity due to partial fusion or melting of the polymer in one or more yarns. However, the fabric is primarily treated as described above, and any thermal fusion or film formation that may occur is minimal.

As the skilled artisan will appreciate, various sizing agents and other processing aids can be present on the yarns of fabric to assist in processing the yarns to form the fibrous network. Advantageously the fabrics of the invention are treated, i.e., scoured, prior to calendering to remove yarn lubricants and other processing agents on the yarns of the fabric using conventional scouring processes and solutions. The fabric can be scoured in water at temperatures from 75° F. to 115° F. (24° C. to 46° C.) in a bath pass process and dried at temperatures less than about 160° F. (71° C.). This prepares the fabric substrate for subsequent treatment with water repellent, as described below.

The fabrics of the invention can also be treated with any of the types of agents known in the art for imparting a desired property to the fabric. For example, advantageously, a hydrophobic agent is applied to the fabric to impart water repellency properties to the fabric. It is believed that the application of a water repellent agent to the fabric can prevent water from promoting yarn slippage on impact with a projectile. The hydrophobic agent can be applied to the fabric before or after calendering, and preferably is applied prior to calendering. Any of the various hydrophobic agents and processes for applying the same known in the art can be used.

Multilayer fabric articles, including a plurality of fabric layers arranged in any of the forms, numbers, etc., as known in the art, can be constructed using the fabrics of the invention. The fabrics of the invention are particularly useful as components of "soft" armor, which is typically a flexible, multiple layer structure. The fabrics of the invention can also be used in constructing vests, linings, and other articles of clothing comprising multiple layers of fabric.

It is convenient to characterize the geometries of such multilayer fabric structures by the geometries of the fibers or filaments therein. One such suitable arrangement is a plurality of layers in which each layer comprises a network of fibers or filaments and successive layers of such fabrics are rotated with respect to the previous layer. An example of such a multilayer fabric structure is a five layered structure in which the second, third, fourth and fifth layers are rotated +45°, −45°, 90°, and 0°, with respect to the first layer, but not necessarily in that order. Another example is a fabric which includes fabric layers rotated 90° with respect to each other.

Multilayer fabric articles of the invention can vary with regard to density, number of fabric layers, etc. The specific weight of the multilayer fabric article can be expressed in terms of areal density (AD). This areal density corresponds to the weight per unit area of the multiple layer structure. The multilayer fabric articles of the invention can have good flexibility and fewer fabric layers, and thus increased comfort at reduced cost. These properties can be coupled with excellent ballistic protection, i.e., ballistic properties equal to, and surpassing, a multilayer fabric article of the same weight, construction, number of layers, etc. formed of non-calendered fabrics.

The fabrics of the invention can also be incorporated as components of other types of composite materials to provide the same types of benefits, i.e., reduced number of fabric layers, reduced weight and cost, increased comfort, improved ballistic performance, etc. For example, the fabrics of the invention can be used in combination with composites of high strength polyethylene fibers in a polymeric matrix, generally known in the art as Spectra® Shield, available commercially from Allied Signal, Inc.

The present invention will be further illustrated by the following non-limiting examples.

EXAMPLE 1

Preparation of Fabric

A plain weave fabric having 45 ends/inch in both the warp and fill direction was prepared from a high molecular weight polyethylene yarn available from Allied Signal, Inc. under the trade designation Spectra®. The warp yarn was twisted about 2 TPI (turns per inch), beamed, and woven on a Dornier loom. After weaving, the yarn lubricants were removed by washing in hot water (75° F. to 115° F.). Thereafter, a water repellent agent Zonyl D available from DuPont was applied to the woven fabric, and the fabric was passed between the nip of heated cooperating pressure rolls at a speed of about 27 meters per minute (m/m). The calender rolls were set to a pressure of about 300 Newtons and a temperature of about 122° F. The resultant fabric had a substantially smooth, flat appearance, and the yarns within the fabric has a flattened appearance.

A comparative fabric was also prepared as described above, except that the fabric was not calendered.

EXAMPLE 2

Ballistics Performance

A multilayer fabric target (or shot pack) was prepared using the fabric of the invention as described in Example 1 above (Sample A). A comparative shot pack was also prepared, using the non-calendered comparative fabric of Example 1 (Sample B). The shot packs included 45 layers of fabric, with a total areal density (AD) of 4.1 kg/m².

The fabric targets were one and one-half foot (27 inches) square and were tested against 9 mm full metal jacketed bullets to obtain a $V_{50}$ value for each pack. Most screening studies of ballistic composites employ a 9 mm full metal jacketed bullet of specified weight (124 grains), hardness and dimensions (Mil. Spec. MIL-STD-662E (ORD)). The protective power of a structure is normally expressed by citing the impacting velocity at which 50% of the projectiles are stopped and is designated the $V_{50}$ value.

To compare structures having different $V_{50}$ values and different areal densities, the following examples state the ratios of the kinetic energy (Joules) of the projectile at the $V_{50}$ velocity, to areal density of the fabric (kg/m²). This ratio is designated as the Specific Energy Absorption (SEA).

Ballistic results are set forth in Table 1 below:

TABLE 1

| SAMPLE | Fabric AD (kg/m²) | Target AD (kg/m²) | $V_{50}$ (ft/sec) | SEA (J/m²/kg) |
|---|---|---|---|---|
| A | 4.10 | 3.66 | 1.571 | 383 |
| B | 4.10 | 3.66 | 1.477 | 360 |

As illustrated by the data in Table 1, the fabrics of the invention provide several advantages over a composite fabric formed of non-calendered fabric layers. The fabrics of the invention can provide an article up to 25% thinner than a comparative article having a much higher $V_{50}$ value. Further, for articles of substantially equal weights and construction, the fabrics of the invention can provide $V_{50}$ values up to 70 ft./sec. higher. Further benefits can include reduced trauma to the victim by reduced "backfaced signature" i.e., the deformation of the fabric into the victim.

EXAMPLE 3

Fabric Performance in Combination with Spectra® Shield

Multiple layers of fabric of the invention as described in Example 1 above are combined with a composite material available from Allied Signal Inc. as Spectra® Shield, which includes polyethylene fibers in a polymeric matrix. The resultant article including the fabric layers of the invention and the Spectra® Shield product are also evaluated with regard to ballistic performance. The results indicate that the fabrics of the invention are also useful in combination with other ballistic resistant materials. The articles of the invention can provide ballistic protection equal to and better than conventional composite materials, i.e., can exhibit excellent projectile penetration resistance and multiple hits and fragment performance. Such articles can also be substantially thinner and weigh and cost less.

The foregoing examples are illustrative of the present invention and are not to be construed as limiting thereof. The invention is defined by the following claims, with equivalents of the claims to be included therein.

That which is claimed is:

1. A calendered fabric comprising a network of consolidated multifilament yarns comprising high strength filaments, at least a portion of said high strength filaments being temporarily locked together within said yarns to provide a substantially stable flattened cross-sectional configuration to said yarns and wherein said yarns have a substantially stable, crimped structure at their cross-over points.

2. The fabric of claim 1, wherein said multifilament yarns have substantially individual fibrous identities.

3. The fabric of claim 1, wherein said high strength filaments have a tenacity of at least 7 grams/denier, a tensile modulus of at least about 150 grams/denier and an energy-to-break of at least about 8 Joules/gram.

4. The fabric of claim 1, wherein said high strength filaments are selected from the group consisting of extended chain polyolefin filaments, aramid filaments, polyvinyl alcohol filaments, polyacrylonitrile filaments, liquid crystalline polymer filaments, glass filaments, carbon filaments, high tenacity polyamide filaments, high tenacity polyester filaments, polybenzoxazole filaments, and mixtures thereof.

5. The fabric of claim 4, wherein said high strength filaments are extended chain polyethylene filaments.

6. The fabric of claim 1, wherein said fabric is a woven fabric.

7. The fabric of claim 6, wherein said woven fabric comprises a fill yarn and a warp yarn and at least one of said fill yarn and said warp yarn includes said high strength filaments.

8. The fabric of claim 7, wherein said fill yarn and said warp yarns both comprise said high strength filaments.

9. The fabric of claim 1, wherein said network of flattened, consolidated multifilament yarns are capable of receiving an impact from a projectile directed toward said fabric and of engaging said projectile upon impact with said fabric to substantially decrease the velocity thereof, and wherein said multifilament yarns also are capable of slipping relative to one another upon impact of said projectile to substantially dissipate the energy of impact thereof.

10. A calendered woven fabric comprising a plurality of consolidated multifilament fill yarns and a plurality of consolidated multifilament warp yarns, each of said fill yarns and said warp yarns comprising extended chain polyethylene filaments, at least a portion of said high strength filaments being temporarily locked together within said fill yarns and said warp yarns to provide a substantially stable flattened cross-sectional configuration to said fill yarns and said warp yarns, wherein said fabric of flattened consolidated multifilament fill and warp yarns is capable of receiving an impact from a projectile directed toward said fabric and of engaging said projectile upon impact with said fabric to substantially decrease the velocity thereof, and wherein said multifilament fill and warp yarns also are capable of slipping relative to one another upon impact of said projectile to substantially dissipate the energy of impact thereof.

11. A ballistic resistant multilayer composite comprising as at least one layer a calendered network of consolidated multifilament yarns comprising high strength filaments, at least a portion of said high strength filaments being temporarily locked together within said yarns to provide a substantially stable flattened cross-sectional configuration to said yarns and wherein said yarns have a substantially stable, crimped structure at their cross-over points.

12. The composite of claim 11, further comprising as at least one layer a composite formed of a plurality of high strength filaments distributed within a polymeric matrix.

13. An article of manufacture comprising a body comprising as at least one layer a calendered network of consolidated multifilament yarns comprising high strength filaments, at least a portion of said high strength filaments being temporarily locked together within said yarns to provide a substantially stable flattened cross-sectional configuration to said yarns and wherein said yarns have a substantially stable, crimped structure at their cross-over points.

14. The article of claim 13, wherein said article is a vest.

15. A fabric produced by the process comprising:
providing a network of multifilament yarns having a first cross-sectional configuration, at least a portion of said multifilament yarns comprising high strength filaments; and calendering said network to apply heat and pressure to said network under conditions sufficient to consolidate said yarns and to temporarily lock together at least a portion of said high strength filaments within said yarns to provide a second, substantially stable flattened cross-sectional configuration to said yarns.

16. A fabric produced according to the process comprising:

calendering a woven fabric comprising a network of multifilament yarns having a first cross-sectional configuration, at least a portion of said multifilament yarns comprising high strength filaments, at a pressure ranging from about 290 to 310 Newtons, a temperature ranging from about 45 to 55° C., and a speed ranging from about 22 to 30 meters per minute, to consolidate said yarns and to temporarily lock together a portion of said high strength filaments within said yarns to provide a second, substantially stable flattened cross-sectional configuration to said yarns.

* * * * *